(12) United States Patent
Li et al.

(10) Patent No.: US 12,388,524 B2
(45) Date of Patent: Aug. 12, 2025

(54) METHOD, DEVICE AND COMPUTER PROGRAM PRODUCT FOR WIRELESS COMMUNICATION

(71) Applicant: ZTE CORPORATION, Guangdong (CN)

(72) Inventors: Zhijun Li, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 365 days.

(21) Appl. No.: 18/140,573

(22) Filed: Apr. 27, 2023

(65) Prior Publication Data

US 2023/0353238 A1 Nov. 2, 2023

Related U.S. Application Data

(63) Continuation of application No. PCT/CN2020/124497, filed on Oct. 28, 2020.

(51) Int. Cl.
 *H04B 7/185* (2006.01)

(52) U.S. Cl.
 CPC ..... *H04B 7/18589* (2013.01); *H04B 7/18593* (2013.01)

(58) Field of Classification Search
 CPC ............ H04B 7/18589; H04B 7/18593; H04B 7/1851; H04B 7/18519; H04B 7/18563; H04W 84/06; H04W 48/16; H04W 76/12
 USPC ......................................................... 455/406
 See application file for complete search history.

(56) References Cited

U.S. PATENT DOCUMENTS

| | | | | |
|---|---|---|---|---|
| 11,064,057 B2* | 7/2021 | Sabella | ................... | H04L 69/08 |
| 11,115,867 B2* | 9/2021 | Dowlatkhah | ......... | H04W 28/16 |
| 11,638,316 B2* | 4/2023 | Liao | ..................... | H04W 76/22 370/329 |
| 11,706,713 B2* | 7/2023 | Elkotby | ............ | H04W 52/0229 455/574 |
| 11,863,328 B2* | 1/2024 | Zhu | ...................... | H04L 1/1874 |
| 12,133,269 B2* | 10/2024 | Hoang | .................. | H04L 5/0012 |
| 2003/0203717 A1* | 10/2003 | Chuprun | ............ | H04B 7/18591 455/12.1 |
| 2017/0311290 A1* | 10/2017 | Adjakple | ............... | H04W 76/18 |
| 2017/0331670 A1* | 11/2017 | Parkvall | .............. | H04W 52/028 |
| 2018/0220373 A1* | 8/2018 | Arzelier | ............ | H04W 28/0268 |

(Continued)

FOREIGN PATENT DOCUMENTS

| | | |
|---|---|---|
| CN | 111436115 A | 7/2020 |
| CN | 111629400 A | 9/2020 |

(Continued)

OTHER PUBLICATIONS

3rd Generation Partnership Project; Technical Specification Group Services and System Aspects; Study on architecture aspects for using satellite access in 5G (Release 17), 3GPP TR 23.737 V17.1.0 (Jul. 2020), 59 pages.

(Continued)

*Primary Examiner* — Mahendra R Patel
(74) *Attorney, Agent, or Firm* — Foley & Lardner LLP

(57) ABSTRACT

Method, device and computer program product for wireless communication are provided. A method includes: transmitting, by a radio access node to an access management node, satellite access information. The satellite access information is adapted to be used for at least one of a session policy acquisition or a satellite usage collection.

15 Claims, 12 Drawing Sheets

(56) References Cited

U.S. PATENT DOCUMENTS

| | | | |
|---|---|---|---|
| 2020/0120458 A1* | 4/2020 | Aldana | H04W 28/22 |
| 2020/0212998 A1* | 7/2020 | Sangireddi | H04B 7/18582 |
| 2021/0153254 A1* | 5/2021 | Zhu | H04L 5/0055 |
| 2022/0103973 A1* | 3/2022 | Sirotkin | H04W 4/029 |
| 2022/0104277 A1* | 3/2022 | Narasimha | H04W 72/0453 |
| 2022/0167140 A1* | 5/2022 | Shrestha | H04W 4/90 |
| 2022/0272620 A1* | 8/2022 | Ninglekhu | H04W 40/02 |

FOREIGN PATENT DOCUMENTS

| | | | | |
|---|---|---|---|---|
| CN | 113424508 A | * | 9/2021 | H04L 65/756 |
| CN | 113785660 A | * | 12/2021 | H04W 12/033 |
| WO | WO-2011134436 A1 | * | 11/2011 | H04W 36/00224 |
| WO | WO-2020146506 A2 | * | 7/2020 | H04W 74/0833 |
| WO | WO-2020/167220 A1 | | 8/2020 | |
| WO | WO-2020/205725 A1 | | 10/2020 | |
| WO | WO-2020198517 A1 | * | 10/2020 | H04W 4/90 |

OTHER PUBLICATIONS

Notice of Grounds of Rejection for JP Appl. No. 2023-526074, dated Jul. 23, 2024 (with English translation, 7 pages).

ZTE, "Further Discussion on LEO Feeder Link Switch-Over", 3GPP TSG-RAN3 Meeting #110-e, R3-206687, Nov. 12, 2020, Online (3 pages).

International Search Report and Written Opinion for PCT Appl. No. PCT/CN2020/124497, mailed on Jul. 26, 2021 (7 pages).

Nokia et al., "Update of RAT Type solution", 3GPP TSG-SA WG2 Meeting #134, S2-1908447, Jun. 28, 2019, Sapporo, Japan (4 pages).

3rd Generation Partnership Project; Technical Specification Group Services and System Aspects; Study on architecture aspects for using satellite access in 5G (Release 16), 3GPP TR 23.737 V1.1.0, Oct. 2019 (65 pages).

D4 Thales: "Sat5G (761413) D4.4 Harmonisation of SATCOM with 5G Control and User planes Project Title Satellite and Terrestrial Network for 5G Project Acronym SaT5G Contractual Delivery Date M27 (Final)", Dec. 1, 2019 (201 pages).

Extended European Search Report for EP Appl. No. 20959071.0, dated Apr. 29, 2024 (9 pages).

CATT, "TS 23.502: Solving ENs related to PDU session establishment procedure", SA WG2 Meeting #122bis, S2-176543, Aug. 25, 2017, Sophia Antipolis, France (13 pages).

Notice of Grounds of Rejection for JP Appl. No. 2023-526074, dated Jan. 21, 2025 (with English translation, 12 pages).

* cited by examiner transmitting, by an radio access node to an access management node, satellite access information 710

METHOD, DEVICE AND COMPUTER PROGRAM PRODUCT FOR WIRELESS COMMUNICATION

This application is a continuation of PCT/CN2020/124497, filed Oct. 28, 2020, the content of which is incorporated herein by reference in its entirety.

TECHNICAL FIELD

This document is directed generally to wireless communications.

BACKGROUND

The integration of satellite networks and terrestrial networks is a recent trend in satellite communications. The effective use of cellular networks, their functional entities, signaling procedures and interfaces in satellite networks is an important part of NTN (non-terrestrial network) development and is conducive to the effective integration and unified management of satellite networks and terrestrial networks.

SUMMARY

In an area which is not covered by the terrestrial network coverage, a user equipment (UE) may find suitable satellites to setup satellite connection and access the terrestrial network (e.g., the 5G network) via satellite access (e.g., via a satellite network). According to the altitude of each satellite, the satellites may be classified to different satellite types: Geosynchronous Equatorial Orbit (GEO) satellites, Medium Earth Orbit (MEO) satellites or Low Earth Orbit (LEO) satellites. Each type of satellites can provide differentiated quality-of-service (QOS). For example, compared to the MEO/GEO satellite, the LEO satellite can provide the QoS with the least latency and the highest bitrates.

Policy and charging control of the satellite network access is different from that of the terrestrial network access. Particularly, QoS management for satellite communications (also called satellite access in the disclosure) is different from terrestrial network communications. Moreover, different satellite types (e.g., GEO/MEO/LEO satellite) may require differentiated QoS control. Besides, an operator may configure different charging policies with different satellite companies. Thus, the charging system is required to identify the satellite companies of satellites.

This document relates to methods, systems, and devices of providing information associated with satellite accesses, and more particularly to methods, systems, and devices of providing information associated with satellite accesses to the core network (CN) network function, e.g., for generating appropriate service policies and charging policies for a satellite access system.

The present disclosure relates to methods, devices, and computer program products for wireless communication, which can use satellite access information for a session policy acquisition or a satellite usage collection.

One aspect of the present disclosure relates to a wireless communication method. In an embodiment, the wireless communication method includes: transmitting, by a radio access node to an access management node, satellite access information. The satellite access information is adapted to be used for at least one of a session policy acquisition or a satellite usage collection.

One aspect of the present disclosure relates to a wireless communication method. In an embodiment, the wireless communication method includes: receiving, by an access management node from a radio access node, satellite access information; and transmitting, by the access management node to a session management node, the satellite access information. The satellite access information is adapted to be used for at least one of a session policy acquisition or a satellite usage collection.

One aspect of the present disclosure relates to a wireless communication method. In an embodiment, the wireless communication method includes: receiving, by a session management node from an access management node, satellite access information; and acquiring, by the session management node, a session management policy according to the satellite access information.

One aspect of the present disclosure relates to a wireless communication method. In an embodiment, the wireless communication method includes: receiving, by a session management node from an access management node, satellite access information; and sending, by the session management node to a network system managing satellite usage, a satellite usage report corresponding to the satellite access information, to allow the network system to perform satellite usage management.

Another aspect of the present disclosure relates to a radio access node. In an embodiment, the radio access node includes a communication unit and a processor. The processor is configured to transmit satellite access information to an access management node. The satellite access information is adapted to be used for at least one of a session policy acquisition or a satellite usage collection.

Another aspect of the present disclosure relates to an access management node. In an embodiment, the access management node includes a communication unit and a processor. The processor is configured to receive satellite access information from a radio access node and transmit the satellite access information to a session management node. The satellite access information is adapted to be used for at least one of a session policy acquisition or a satellite usage collection.

Another aspect of the present disclosure relates to a session management node. In an embodiment, the session management node includes a communication unit and a processor. The processor is configured to receive satellite access information from an access management node and acquire a session management policy according to the satellite access information.

Another aspect of the present disclosure relates to a session management node. In an embodiment, the session management node includes a communication unit and a processor. The processor is configured to receive satellite access information from an access management node; and send, to a network system managing satellite usage, a satellite usage report corresponding to the satellite access information to allow the network system to perform satellite usage management.

Various embodiments may preferably implement the following features:

Preferably or in some embodiments, the satellite access information includes at least one of: a Radio Access Technology, RAT, type used for satellite access or a satellite ID.

Preferably or in some embodiments, the RAT type used for satellite access includes an indicator of one of Geostationary Orbit, GEO, satellite, Medium Earth Orbit, MEO, satellite, and Low Earth Orbit, LEO, satellite.

Preferably or in some embodiments, the satellite access information is acquired according to information from a gateway between a satellite and the radio access node.

Preferably or in some embodiments, the satellite access information is acquired according to information from a gateway during a Radio Resource Control, RRC, connection establishment process for a wireless communication terminal.

Preferably or in some embodiments, the satellite access information is transmitted to the access management node via a Next Generation Application Protocol, NG-AP, message.

Preferably or in some embodiments, the satellite access information is transmitted to the access management node along with a registration request for a wireless communication terminal.

Preferably or in some embodiments, the satellite access information is transmitted to the session management node via a message for a Protocol Data Unit, PDU, session.

Preferably or in some embodiments, the satellite access information is received via a Next Generation Application Protocol, NG-AP, message.

Preferably or in some embodiments, the satellite access information is received along with a registration request for a wireless communication terminal.

Preferably or in some embodiments, the session management policy is acquired in response to sending the satellite access information to a policy control node to allow the policy control node to decide the session management policy according to the satellite access information.

Preferably or in some embodiments, the satellite usage report is sent to a charging node in the network system.

The present disclosure relates to a computer program product including a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 7 illustrates a wireless communication method according to an embodiment of the present disclosure.

DETAILED DESCRIPTION

A simple architecture of accessing a 5G network via satellites is a transparent satellite access network architecture in which the satellite acts as an analogue radio frequency (RF) repeater and provides a transparent tunnel between the user equipment (UE) and the Radio Access Network (RAN). In general, the satellite repeats an NR-Uu radio interface from a feeder link (between the NTN gateway and the satellite) to a service link (between the satellite and the UE) and vice versa.

Figure 1:
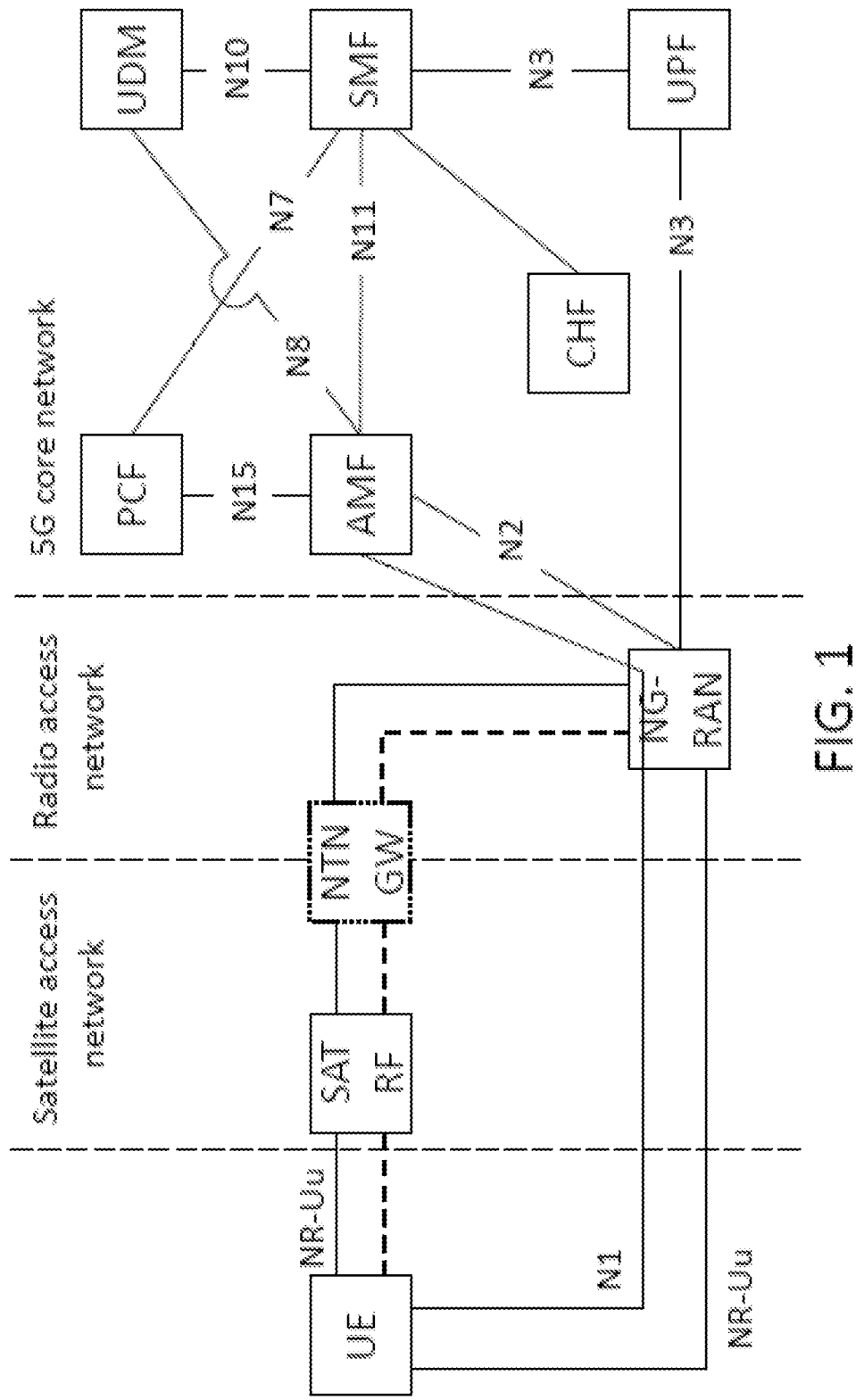
FIG. 1 shows a schematic diagram of a transparent satellite access network architecture according to an embodiment of the present disclosure.

FIG. 1 shows a schematic diagram of a transparent satellite access network architecture according to an embodiment of the present disclosure. The network entities or network functions shown in FIG. 1 includes:
1) UE: User Equipment The UE corresponds to a mobile terminal accessing to a 5G network, either directly via a Next Generation Radio Access Network (NG RAN) (e.g., gNB) or via a satellite.
2) SAT RF: Satellite Radio Function The satellite payload implements frequency conversion and a Radio Frequency amplifier in both uplink and downlink direction.
3) NTN GW: Non-Terrestrial Network Gateway The NTN GW supports all necessary functions to forward the signal of NR-Uu interface. In some embodiments, the NTN GW is deployed on the ground, and one NTN GW may be configured to serve multiple gNBs.
4) NG RAN: Next Generation Radio Access Network In a 5G network, the NG RAN is an NR base station, which is also named gNB.
5) AMF: Access and Mobility Management function.

The AMF provides access management and mobility management for a UE, e.g., the registration to the network, the mobility registration for UE, etc.

6) SMF: Session Management Function

The SMF provides PDU session management for a UE, e.g., internet protocol (IP) address allocation, QoS flow setup, etc.

7) UPF: User plane function.

The UPF provides IP traffic routing and forwarding management.

8) PCF: Policy Control Function

The PCF provides QoS policy rules to control plane functions to enforce the rules.

9) CHF: Charging Function

The CHF collects charging reports from other network function, such as the SMF. The CHF belongs to a charging system.

10) UDM: Unified Data Management

The UDM manages data for access authorization, user registration, and data network profiles.

In an operator's network, one or more NTN GWs may be deployed for satellite access (e.g., satellite communications). In some embodiments, one NTN GW is deployed on the ground and configured to connect one or more gNBs, to serve multiple satellites.

When there is no terrestrial network coverage, the UE may find suitable satellites to setup (e.g., build or set) a satellite connection for accessing the 5G network through the satellite access, so as to get packet data unit (PDU) service from the 5G network.

Figure 2A:
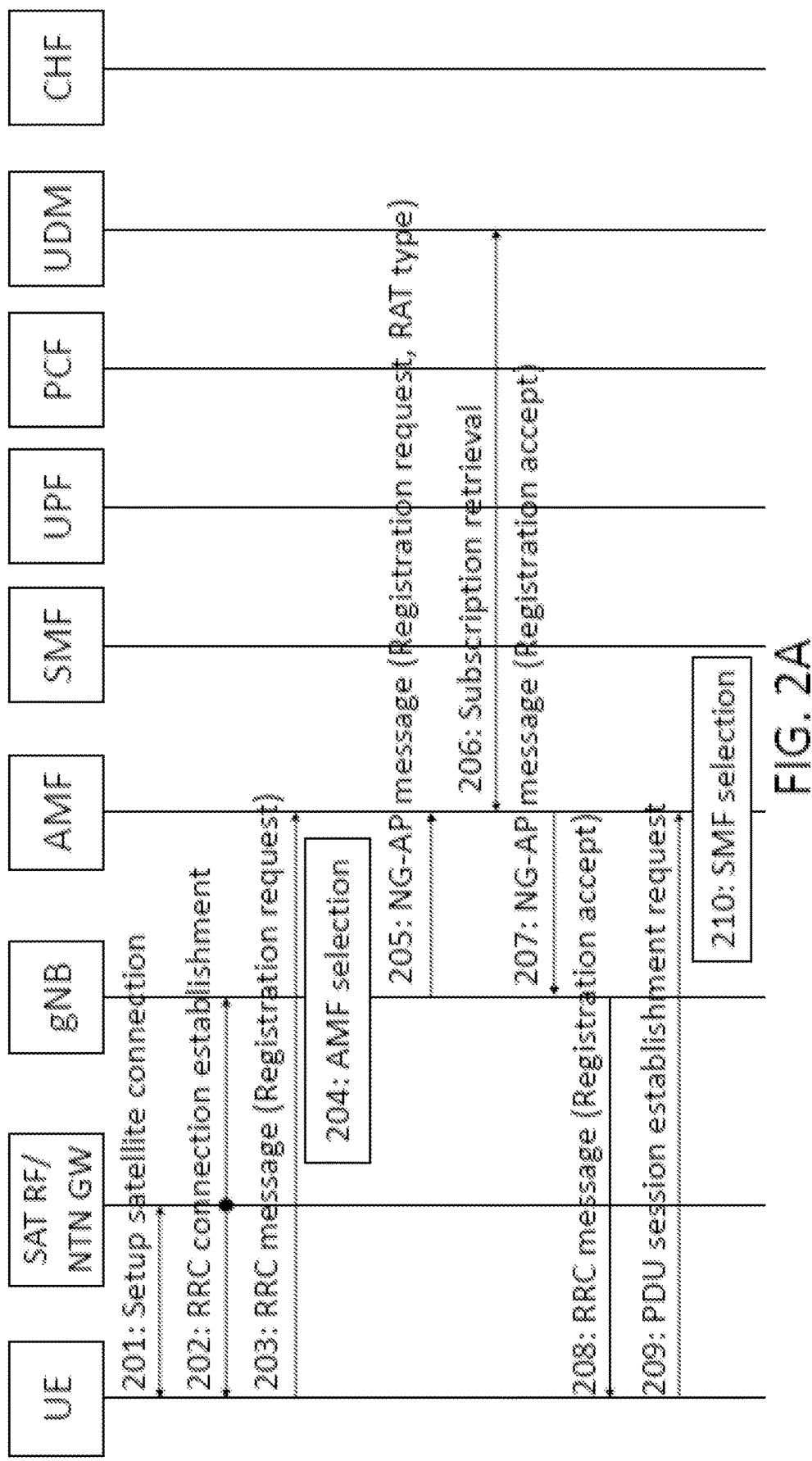
FIGS. 2A and 2B show schematic diagrams of a procedure of requesting PDU service from a 5G network via satellite access according to an embodiment of the present disclosure.
Figure 2B:
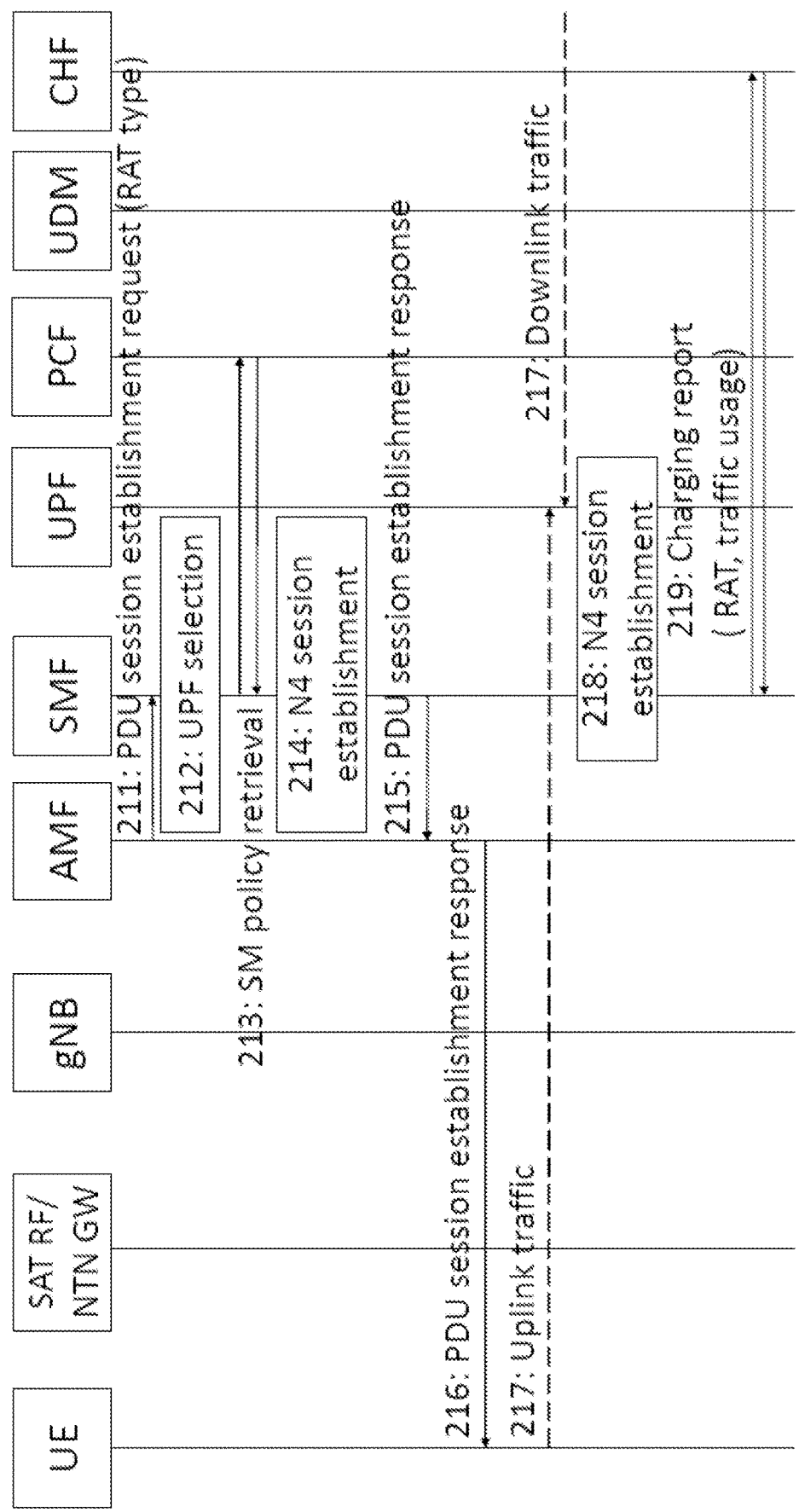

FIG. 2A and FIG. 2B show schematic diagrams of a procedure of requesting PDU service from a 5G network via satellite access according to an embodiment of the present disclosure.

More specifically, the UE sets up a connection with a satellite in step 201 shown in FIG. 2A. In an embodiment, when the UE moves to an area without terrestrial network coverage (e.g., the area is not covered by the terrestrial network), the UE may decide to access the 5G network via the satellite. The UE then searches available satellites and selects suitable satellite(s) to setup (e.g., set, establish, build) a satellite connection.

In step 202, the UE sets up a radio resource control (RRC) connection towards a gNB (e.g., RAN node or NG-RAN). When receiving a message (e.g., RRC message) from the UE for satellite connection, the satellite transparently forwards the message to the connected NTN GW and the NTN GW transparently forwards the message to a proper gNB. The NTN GW may use a satellite cell identifier (ID) corresponding to the satellite to decide to forward the message to which gNB.

In step 203, the UE sends a registration request to the gNB, in which the registration request is encapsulated in an RRC message. The RRC message is transparently forwarded by the satellite and the NTN GW to reach the gNB.

In step 204, the gNB selects an appropriate AMF for the UE.

In step 205, the gNB forwards the registration request to the selected AMF. In an embodiment, the registration request message is encapsulated in an NG (next generation) application protocol (NG-AP) message. In an embodiment, the gNB indicates the following information in the NG-AP message: the global RAN Node ID of the NG-RAN, the satellite cell ID, etc. The AMF determines the radio access technology (RAT) type as the satellite RAT, e.g., based on the global RAN node ID of the NG-RAN.

In step 206, the AMF retrieves UE subscription from the UDM, to determine whether the registration request can be accepted.

In step 207, if the registration request is accepted, the AMF returns a registration accept message which is encapsulated in an NG-AP message towards the gNB.

In step 208, the gNB forwards the registration accept message to the UE.

In step 209, the UE sends a PDU session establishment request message to the AMF. In an embodiment, necessary parameters such as data network name (DNN), single network slice selection assistance information (S-NSSAI) are included in the PDU session establishment request message.

In step 210, the AMF selects a proper SMF based on the necessary parameters such as DNN (Data Network Name) and/or S-NSSAI (Single Network Slice Selection Assistance Information). In an embodiment, the RAT type (e.g., the Satellite RAT) and the cell ID (e.g., the satellite cell ID) may also be used for the SMF selection.

In step 211 shown in FIG. 2B, the AMF sends a PDU session establishment request message to the SMF. In an embodiment, parameters such as the DNN, the S-NSSAI, the RAT type and the cell ID are included in the PDU session establishment request message (if parameters are available).

In step 212, the SMF selects a proper UPF for the PDU session.

In step 213, the SMF retrieves a session management (SM) policy from the PCF. In an embodiment, the RAT type (e.g., the Satellite RAT) and the Cell ID (e.g., the Satellite Cell ID) may be used as input parameters for the SM (session management) policy retrieval.

In step 214, the SMF establishes an N4 session with the selected UPF.

In step 215, the SMF sends a PDU session establishment response to the AMF when the PDU session establishment succeeds.

In step 216, the AMF sends the PDU session establishment response to the UE. The PDU session establishment response message encapsulated in an NG-AP message is sent to the gNB. The gNB forwards the PDU session establishment response message to the UE, in which the PDU session establishment response message is encapsulated in an RRC message.

In step 217, after the PDU session is successfully established, the UPF is able to forward uplink traffic from the UE to a remote server, and/or forward downlink traffic from a remote server to the UE. When forwarding the traffic, the UPF counts the traffic usage from/to the UE.

In step 218, the UPF may initiate an N4 session report procedure for sending the traffic usage report to the SMF.

In step 219, the SMF generates charging report based on the traffic usage report from the UPF and sends the charging report to the CHF. The RAT type (e.g., the Satellite RAT) is included in the charging report, so as to allow the charging system to perform RAT specific charging rules.

In the procedure shown in FIG. 2A and FIG. 2B, the RAT type indicating the satellite RAT is provided to the PCF to generate SM policies, e.g., to determine the QoS of the PDU session. The RAT Type and Cell ID are provided to the charging system (e.g., the CHF) to apply differentiated charging policies. The AMF determines the satellite RAT based on, for example, the global RAN node ID of the gNB. However, in some embodiments, the AMF cannot determine which type of satellite (GEO/MEO/LEO satellite) in satellite access is actually used based on the satellite RAT (e.g., the global RAN Node ID). In such embodiments, the AMF may not be able to provide correct RAT type to the PCF to acquire appropriate SM policies. Besides, the AMF does not provide enough information (e.g., the Satellite ID) to the charging system (e.g., the CHF) to apply differentiated charging policies for satellite access.

In order to support the management of access policies and the charging control for satellite access, sufficient satellite access information (e.g., RAT type used for satellite access and/or Satellite ID) may be provided to the core network according to an embodiment.

In some embodiments, when a UE connects the 5G network via a satellite, the NTN GW may have information of which satellite is connected by the UE and the satellite type (GEO/MEO/LEO/Other satellite) of the satellite as well. Accordingly, the NTN GW may provide the satellite access information (e.g., the satellite type, the satellite identifier) to the gNB when it forwards UE messages to the gNB.

Figure 3A:
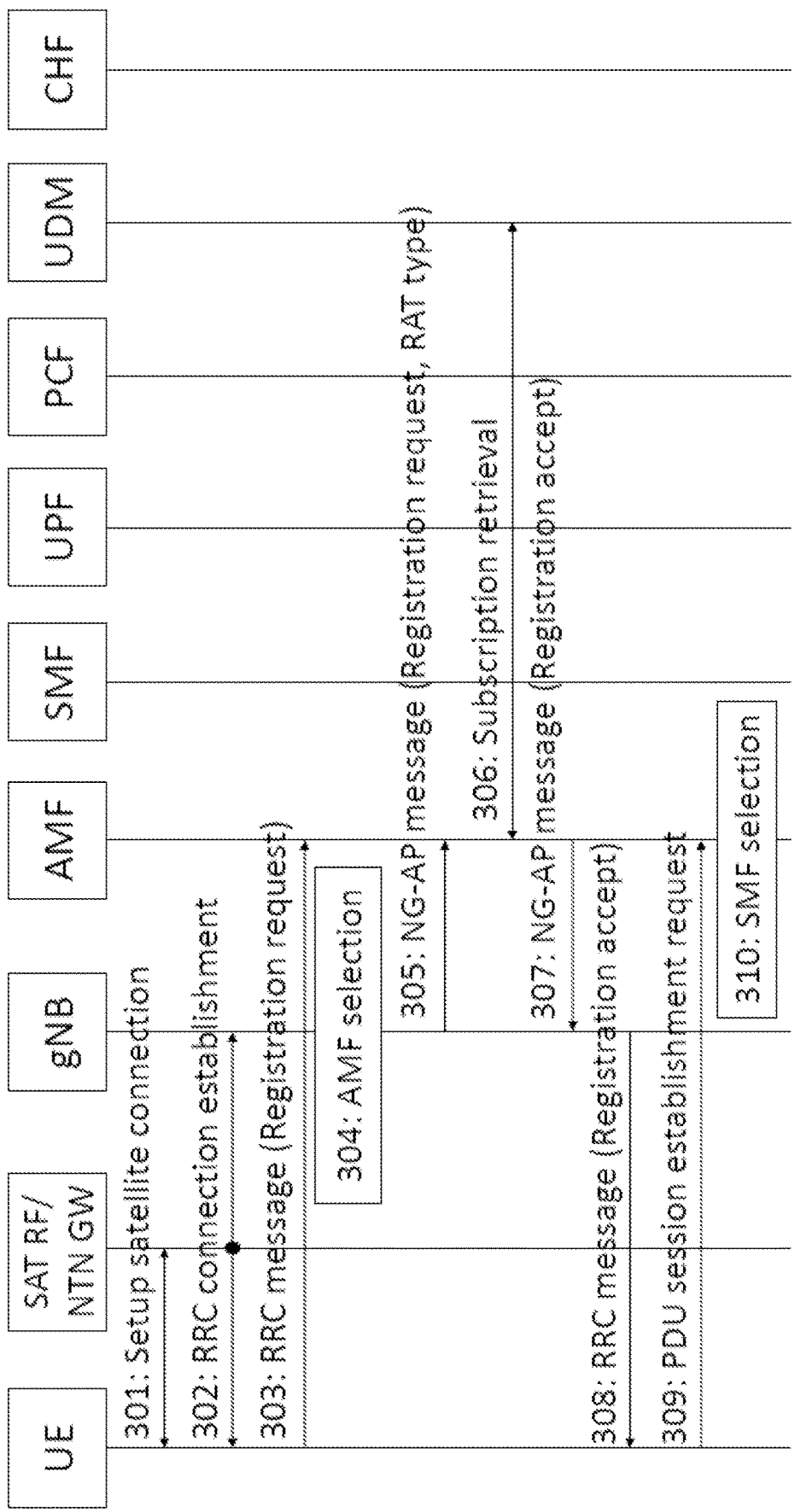
FIGS. 3A and 3B show schematic diagrams of another procedure of requesting PDU service from a 5G network via satellite access according to an embodiment of the present disclosure.
Figure 3B:
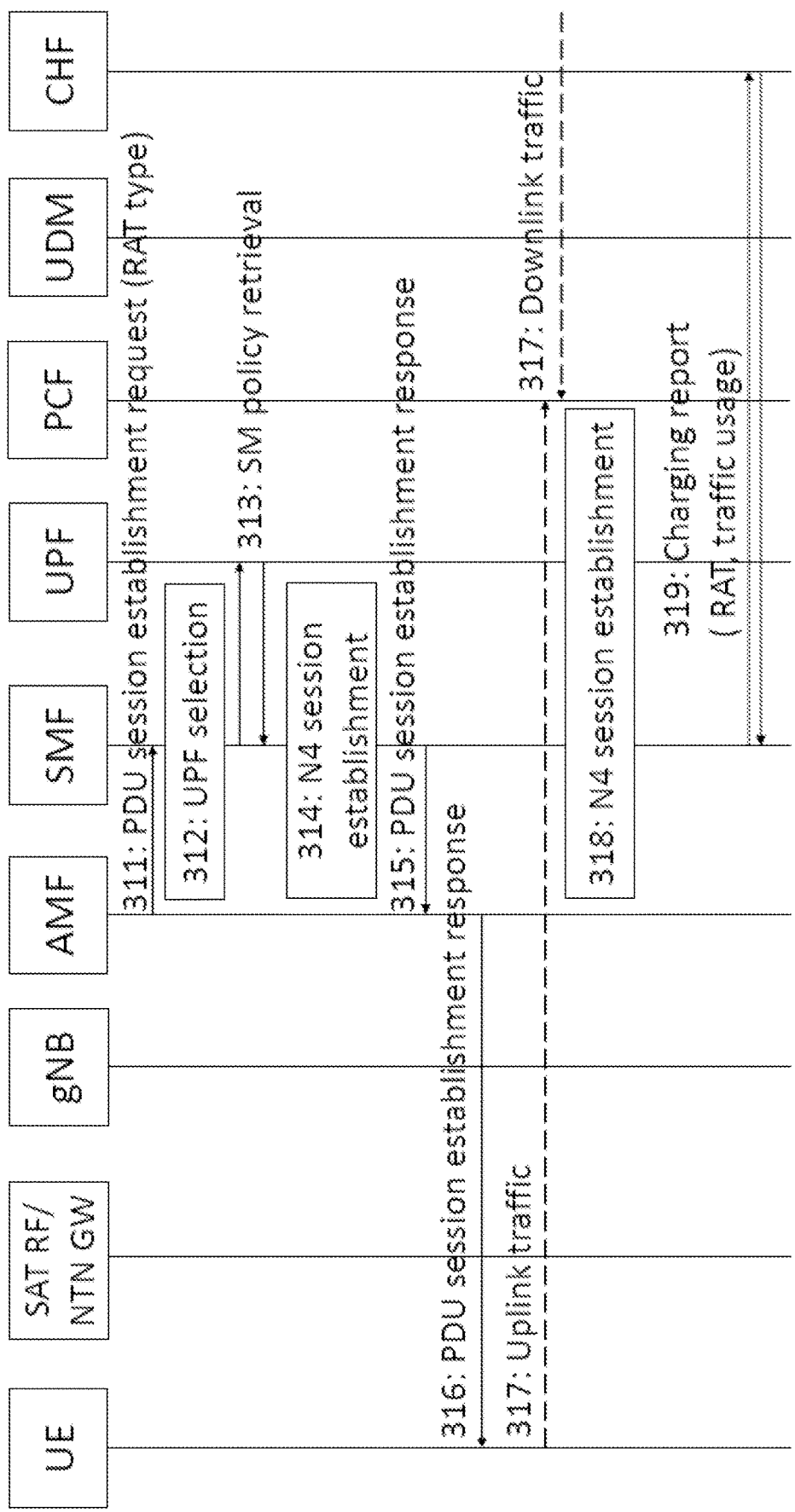

FIG. 3A and FIG. 3B show schematic diagrams of a procedure of requesting PDU service from a 5G network via satellite access according to an embodiment of the present disclosure.

In step 301, the UE sets up a connection with a satellite.

In step 302, the UE sets up an RRC connection to a gNB. In this step, when forwarding the message from the UE to the gNB, the NTN GW indicates the satellite information to the gNB. According to an embodiment, the satellite information may include at least one of the following: (a) the satellite type, indicates either GEO satellite, MEO satellite, LEO satellite or Other Satellite is connected/accessed by the UE; and/or (b) the satellite ID, indicates the identifier of the satellite connected/accessed.

In an embodiment, based on the satellite type, the gNB is able to derive (e.g., determine, acknowledge) the correct RAT type used for satellite access. For example, the derived RAT type may include:

(a) NR(GEO), indicating the UE accesses the NR (New Radio) based a station (e.g., a gNB) via a GEO satellite.

(b) NR(MEO), indicating the UE accesses the NR based station (e.g., a gNB) via a MEO satellite.

(c) NR(LEO), indicating the UE accesses the NR based station (e.g., a gNB) via a LEO satellite.

(d) NR(OTHERSAT), indicating the UE accesses the NR based station (e.g., a gNB) via a satellite of other satellite type.

In step 303, the UE sends a registration request which is encapsulated in an RRC message towards the gNB. In this embodiment, the RRC message is transparently forwarded by the satellite and the NTN GW to reach the gNB.

In step 304, the gNB selects an appropriate AMF for the UE.

In step 305, the gNB forwards the registration request encapsulated in an NG-AP message to the selected AMF.

Note that, when forwarding the registration request encapsulated in the NG-AP message to the selected AMF, the gNB also includes satellite access information in the NG-AP message. In an embodiment, the satellite access information includes at least one of: (a) the RAT type used for satellite access, and/or (b) the Satellite ID.

In this embodiment, the RAT type indicates one of the RAT types used for satellite access (e.g., NR(GEO), NR(MEO), NR(LEO), NR(OTHERSAT)).

In addition, in step 305, the gNB may include the satellite ID in the NG-AP message, for example, based on a local policy. For example, if the charging system requires the satellite ID, the operator may configure the gNB to include (e.g., always include) the satellite ID in the NG-AP message transmitted to the AMF when the satellite ID is available. In step 306, the AMF retrieves UE subscription from the UDM, to determine whether the registration request can be accepted.

In step 307, if the registration request is accepted, the AMF returns a registration accept message which is encapsulated in an NG-AP message towards the gNB.

In step 308, the gNB forwards the registration accept message to the UE.

In step 309, the UE sends a PDU session establishment request message to the AMF. In an embodiment, certain parameters such as DNN and S-NSSAI are included in the PDU session establishment request message.

In step 310, the AMF selects a proper SMF based on the certain parameters mentioned above (e.g., DNN, S-NSSAI) in the PDU session establishment request message.

In an embodiment, the AMF may use the RAT Type (e.g., NR(GEO)/NR(MEO)/NR(LEO)/NR(OTHERSAT)) and cell ID (e.g., the satellite cell ID) as references of selecting the SMF.

In step 311, the AMF sends the PDU session establishment request message to the SMF. In this embodiment, parameters such as DNN and S-NSSAI, are included in the PDU session establishment request message, if available. In addition, when sending the PDU session establishment request message to the SMF, the AMF may also include the satellite access information in the PDU session establishment request message. In an embodiment, the satellite access information includes at least one of: (a) the RAT Type used for satellite access, and/or (b) the Satellite ID.

In this embodiment, the RAT type indicates one of the RAT types used for satellite access (e.g., NR(GEO), NR(MEO), NR(LEO), NR(OTHERSAT)). In an embodiment, the RAT type includes an indicator of one of GEO satellite, MEO satellite, and LEO satellite for satellite access.

In an embodiment, the AMF may include the satellite ID in the PDU session related message, based on a local policy. For example, the operator may configure the AMF to include (e.g., always include) the Satellite ID in the PDU session related message to the SMF when the Satellite ID is available and the charging system has such a requirement.

In step 313, the SMF retrieves an SM policy from the PCF. The SMF provides the satellite access information including the correct RAT type used for satellite access (e.g., NR(GEO)/NR(MEO)/NR(LEO)/NR(OTHER)) to the PCF as input parameters for the SM policy generation or acquisition. In an embodiment, the PCF may determine or generate the SM policy according to the satellite access information or the RAT type used for satellite access and return the SM policy to the SMF.

In step 314, the SMF establishes an N4 session with the selected UPF.

In step 315, the SMF sends a PDU session establishment response to the AMF when the PDU session establishment succeeds.

In step 316, the AMF sends the PDU session establishment response to the UE. The message of the PDU session establishment response is encapsulated in an NG-AP message and is sent to the gNB. The gNB forwards the PDU session establishment response message to the UE, in which the PDU session establishment response message is encapsulated in an RRC message.

In step 317, after the PDU session is successfully established, the UPF is able to forward uplink traffic from the UE to a remote server, and/or forward downlink traffic from a remote server to the UE. When forwarding the traffic, the UPF counts the traffic usage from/to the UE.

In step 318, the UPF may initiate an N4 session report procedure for sending the traffic usage report to the SMF.

In step 319, the SMF generates a charging report based on the traffic usage report received from the UPF and sends the generated charging report to the CHF. In this embodiment, when sending the charging report to the CHF, the SMF sets the satellite access information in the message containing the charging report. The satellite access information includes at least one of: (a) the RAT Type used for satellite access, and/or (b) the Satellite ID.

In an embodiment, the RAT type indicates one of the RAT types used for satellite access (e.g., NR(GEO), NR(MEO), NR(LEO), NR(OTHERSAT)).

In this embodiment, the SMF may set the satellite ID to be included in the charging related message based on the local policy. For example, the operator may configure the SMF to always include the charging related message to the CHF when the satellite ID is available and the charging system requires the satellite ID.

Figure 4:
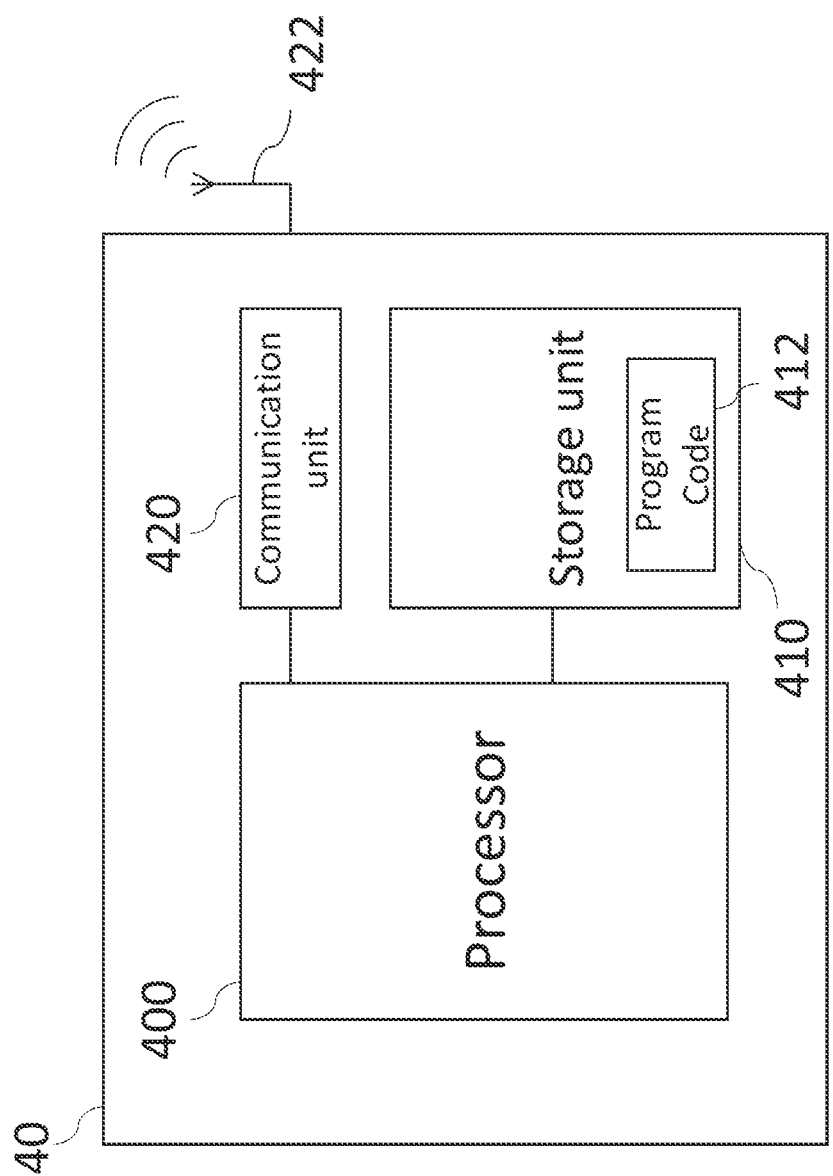
FIG. 4 shows an example of a schematic diagram of a wireless network node according to an embodiment of the present disclosure.

FIG. 4 relates to a schematic diagram of a wireless network node 40 (e.g., a radio access node or a radio access device) according to an embodiment of the present disclosure. The wireless network node 40 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 40 may include (perform) at least one network function such as an access and mobility management function (AMF), a session management function (SMF), a user place function (UPF), a policy control function (PCF), an application function (AF), etc. The wireless network node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 410 include but are not limited to a SIM, ROM, flash memory, RAM, hard-disk, and optical data storage device. The communication unit 420 may be a transceiver and is used to transmit and receive signals (e.g., messages or packets) according to processing results of the processor 400. In an example, the communication unit 420 transmits and receives the signals via at least one antenna 422.

In an embodiment, the storage unit 410 and the program code 412 may be omitted. The processor 400 may include a storage unit with stored program code.

The processor 400 may implement any steps described in exemplified embodiments on the wireless network node 40, e.g., via executing the program code 412.

The communication unit 420 may be a transceiver. The communication unit 420 may as an alternative or in addition be combining a transmitting unit and a receiving unit configured to transmit and to receive, respectively, signals to and from a wireless terminal (e.g., a user equipment) and/or a network node (a network device).

Figure 5:
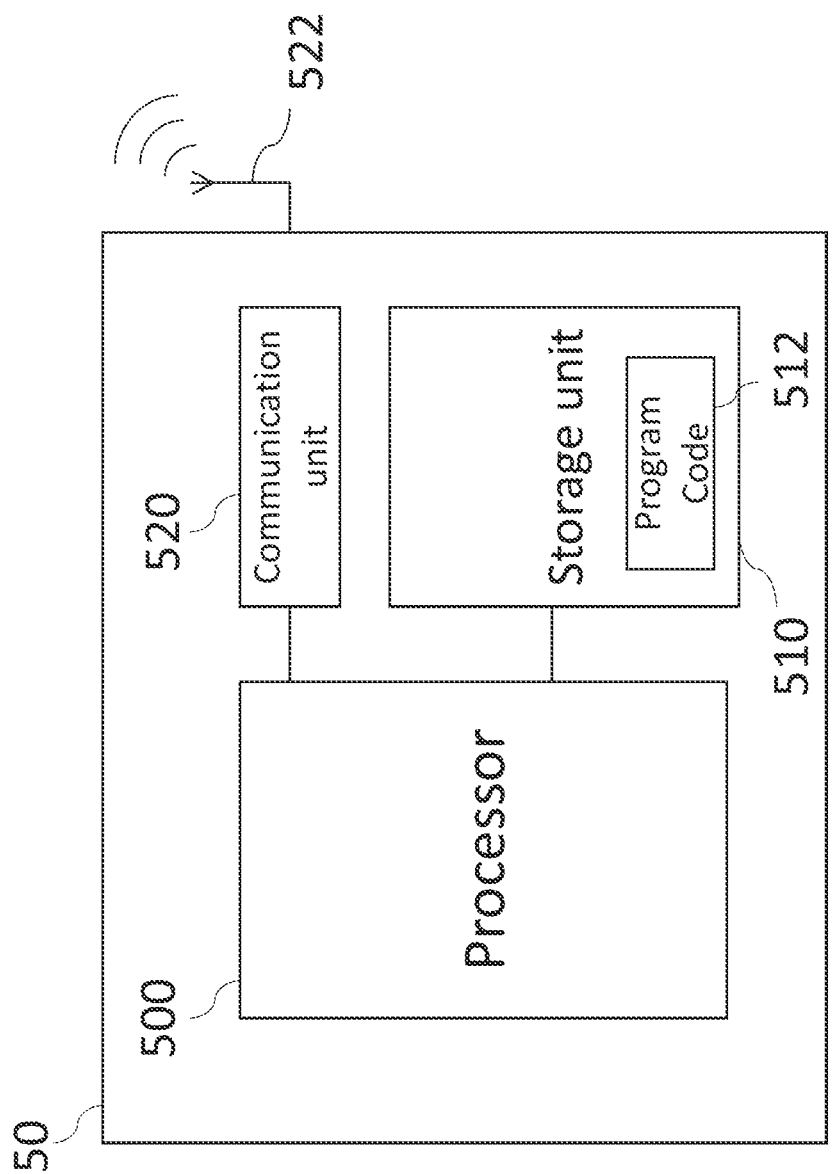
FIG. 5 shows an example of a schematic diagram of a wireless network node according to an embodiment of the present disclosure.

FIG. 5 relates to a schematic diagram of a wireless network node 50 (e.g., an access management node or an access management device) according to an embodiment of the present disclosure. The wireless network node 50 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 50 may include (perform) at least one network function such as an access and mobility management function (AMF), a session management function (SMF), a user place function (UPF), a policy control function (PCF), an application function (AF), etc. The wireless network node 50 may include a processor 500 such as a microprocessor or ASIC, a storage unit 510 and a communication unit 520. The storage unit 510 may be any data storage device that stores a program code 512, which is accessed and executed by the processor 500. Examples of the storage unit 510 include but are not limited to a SIM, ROM, flash memory, RAM, hard-disk, and optical data storage device. The communication unit 520 may be a transceiver and is used to transmit and receive signals (e.g., messages or packets) according to processing results of the processor 500. In an example, the communication unit 520 transmits and receives the signals via at least one antenna 522.

In an embodiment, the storage unit 510 and the program code 512 may be omitted. The processor 500 may include a storage unit with stored program code.

The processor 500 may implement any steps described in exemplified embodiments on the wireless network node 50, e.g., via executing the program code 512.

The communication unit 520 may be a transceiver. The communication unit 520 may as an alternative or in addition be combining a transmitting unit and a receiving unit configured to transmit and to receive, respectively, signals to and from a wireless terminal (e.g., a user equipment) and/or a network node (a network device).

Figure 6:
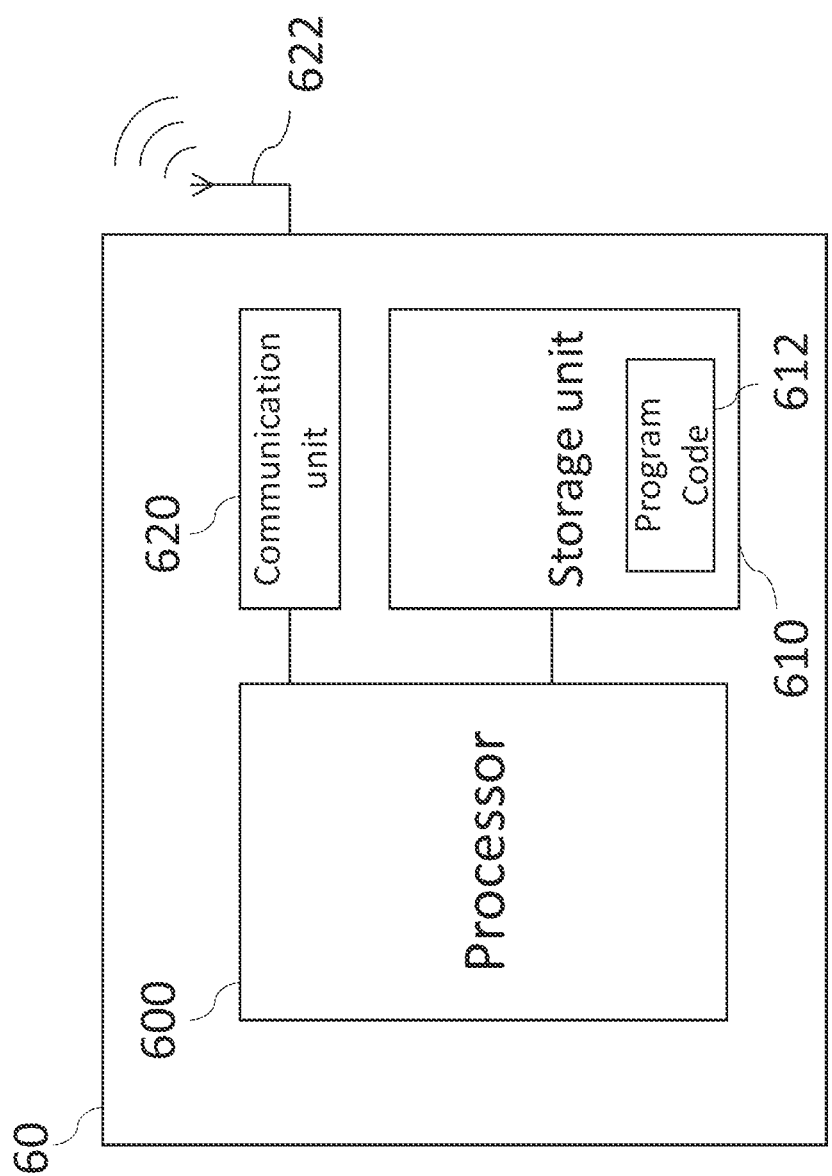
FIG. 6 shows an example of a schematic diagram of a wireless network node according to an embodiment of the present disclosure.

FIG. 6 relates to a schematic diagram of a wireless network node 60 (e.g., a session management node or a session management device) according to an embodiment of the present disclosure. The wireless network node 60 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 60 may include (perform) at least one network function such as an access and mobility management function (AMF), a session management function (SMF), a user place function (UPF), a policy control function (PCF), an application function (AF), etc. The wireless network node 60 may include a processor 600 such as a microprocessor or ASIC, a storage unit 610 and a communication unit 620. The storage unit 610 may be any data storage device that stores a program code 612, which is accessed and executed by the processor 600. Examples of the storage unit 610 include but are not limited to a SIM, ROM, flash memory, RAM, hard-disk, and optical data storage device. The communication unit 620 may be a transceiver and is used to transmit and receive signals (e.g., messages or packets) according to processing results of the processor 600. In an example, the communication unit 620 transmits and receives the signals via at least one antenna 622.

In an embodiment, the storage unit 610 and the program code 612 may be omitted. The processor 600 may include a storage unit with stored program code.

The processor 600 may implement any steps described in exemplified embodiments on the wireless network node 60, e.g., via executing the program code 612.

The communication unit 620 may be a transceiver. The communication unit 620 may as an alternative or in addition be combining a transmitting unit and a receiving unit configured to transmit and to receive, respectively, signals to and from a wireless terminal (e.g., a user equipment) and/or a network node (a network device).

FIG. 7 illustrates a wireless communication method 700 according to an embodiment of the present disclosure. In an embodiment, the wireless communication method 700 may be performed by using a radio access node (e.g., a radio access device). In an embodiment, the access management node may be implemented by using the wireless network node 40 described above, but is not limited thereto.

In an embodiment, the wireless communication method 700 includes an operation 710.

Operation 710 includes transmitting, by a radio access node to an access management node (e.g., an AMF), satellite access information. In an embodiment, the satellite access information is adapted to be used for at least one of a session policy acquisition or a satellite usage collection.

Through such a method, it is possible for the network to use the satellite access information for a session policy acquisition and/or a satellite usage collection.

Details of the satellite access information can be ascertained with reference to the paragraphs above, and will not be repeated herein.

In an embodiment, the satellite access information is acquired according to information from a gateway between a satellite and the radio access node. In an embodiment, the gateway may have features similar to the NTN GW as described above.

In an embodiment, the satellite access information is acquired according to information from the gateway during the RRC connection establishment process for a wireless communication terminal. In an embodiment, the wireless communication terminal may be the UE described above. Details in this regard can be ascertained with reference to the procedure (e.g., step 302) described above, and will not be repeated herein.

In an embodiment, the satellite access information is transmitted to the access management node via a Next Generation Application Protocol, NG-AP, message. In an embodiment, the satellite access information is transmitted to the access management node along with a registration request for a wireless communication terminal. Details in this regard can be ascertained with reference to the procedure (e.g., step 305) described above, and will not be repeated herein.

Figure 8:
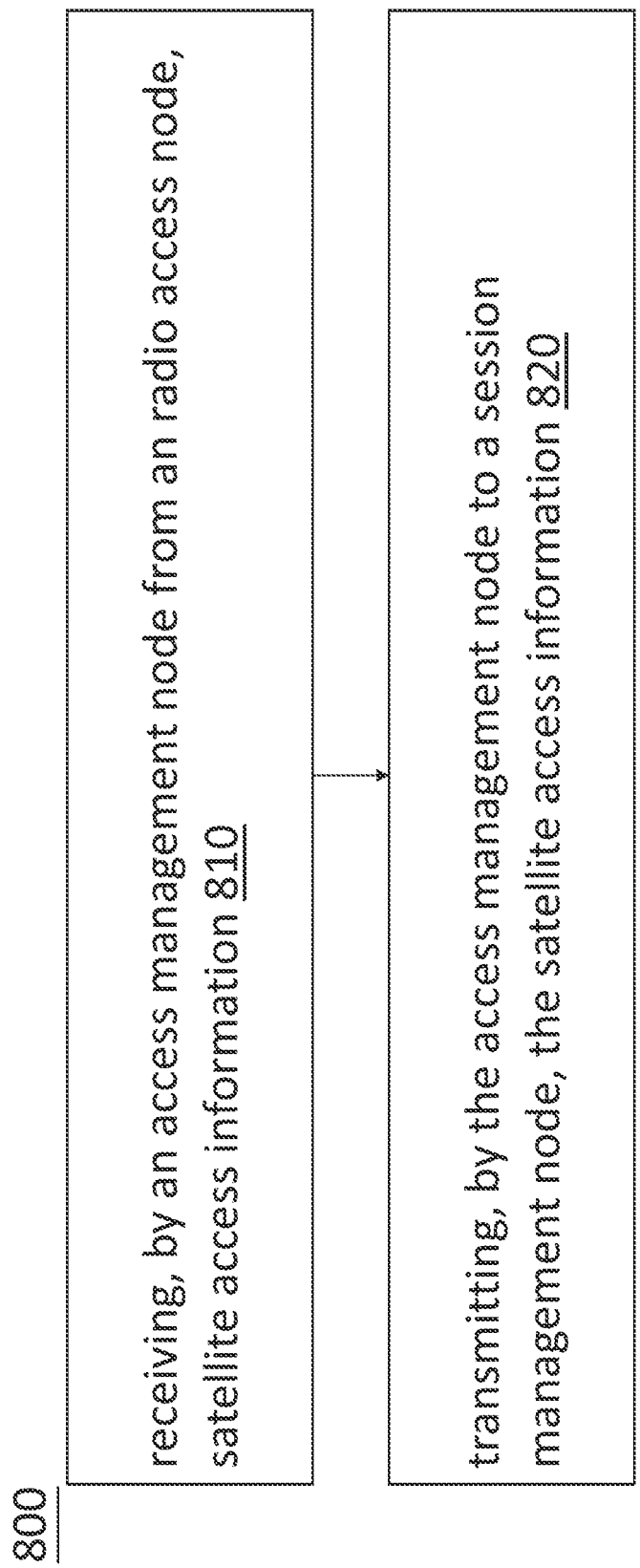
FIG. 8 illustrates another wireless communication method according to an embodiment of the present disclosure.

FIG. 8 illustrates a wireless communication method 800 according to an embodiment of the present disclosure. In an embodiment, the wireless communication method 800 may be performed by using an access management node (e.g., an access management device). In an embodiment, the access management node may be implemented by using the wireless network node 50 described above, but is not limited thereto.

In an embodiment, the wireless communication method 800 includes operations 810 and 820.

Operation 810 includes receiving, by an access management node from a radio access node (e.g., an RAN), satellite access information.

Operation 820 includes transmitting, by the access management node to a session management node (e.g., an SMF), the satellite access information. In an embodiment, the satellite access information is adapted to be used for at least one of a session policy acquisition or a satellite usage collection.

Through such a method, it is possible for the network to use the satellite access information for a session policy acquisition and/or a satellite usage collection.

Details of the satellite access information can be ascertained with reference to the paragraphs above, and will not be repeated herein.

In an embodiment, the satellite access information is transmitted to the session management node via a message for a Protocol Data Unit, PDU, session. Details in this regard can be ascertained with reference to the procedure (e.g., step 311) described above, and will not be repeated herein.

In an embodiment, the satellite access information is received by the access management node via an NG-AP message. Details in this regard can be ascertained with reference to the procedure (e.g., step 305) described above, and will not be repeated herein.

In an embodiment, the satellite access information is received along with a registration request for a wireless communication terminal (e.g., a UE). Details in this regard can be ascertained with reference to the procedure (e.g., step 305) described above, and will not be repeated herein.

Figure 9:
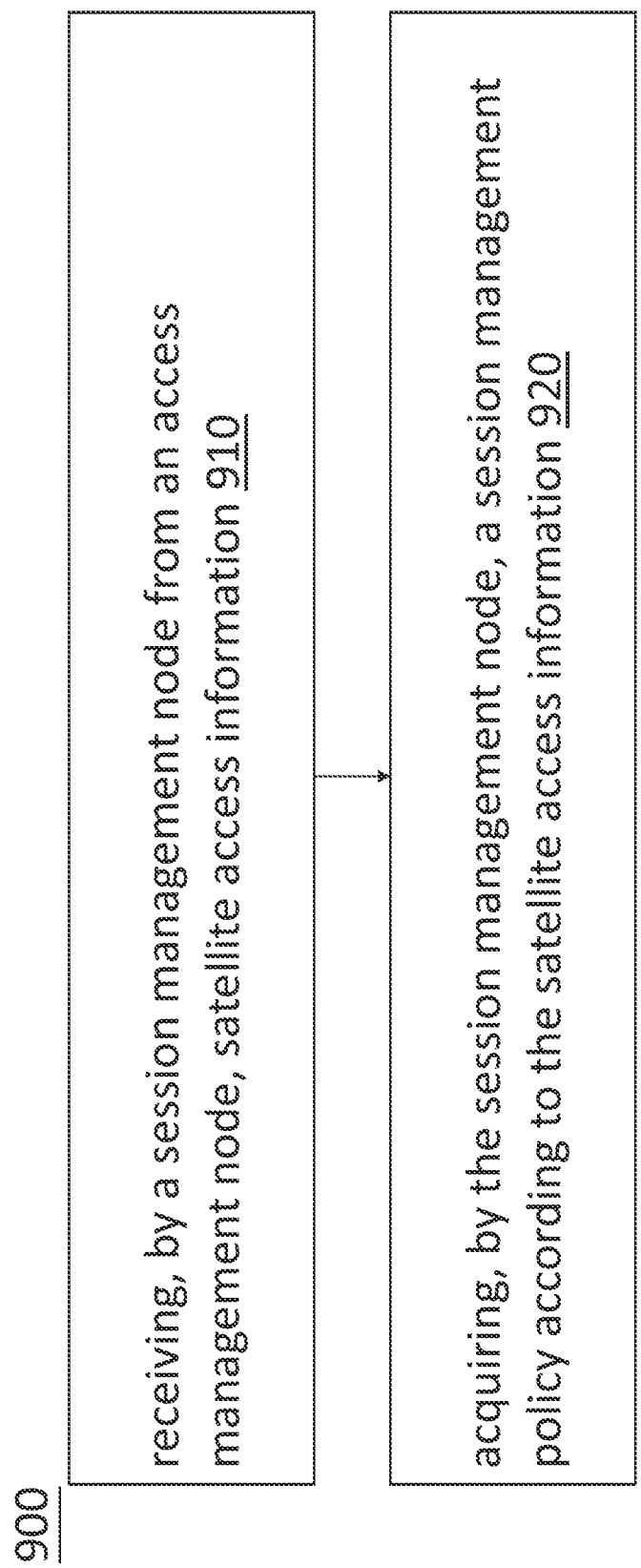
FIG. 9 illustrates another wireless communication method according to an embodiment of the present disclosure.

FIG. 9 illustrates a wireless communication method 900 according to an embodiment of the present disclosure. In an embodiment, the wireless communication method 900 may be performed by using a session management node (e.g., a session management device). In an embodiment, the access management node may be implemented by using the wireless network node 60 described above, but is not limited thereto.

In an embodiment, the wireless communication method 900 includes operations 910 and 920.

Operation 910 includes receiving, by a session management node from an access management node (e.g., an AMF), satellite access information.

Operation 920 includes acquiring, by the session management node, a session management policy according to the satellite access information.

Through such a method, it is possible for the network to acquire the session management policy according to the satellite access information.

Details of the satellite access information can be ascertained with reference to the paragraphs above, and will not be repeated herein.

In an embodiment, the session management policy is acquired in response to sending the satellite access information to a policy control node (e.g., the PCF) to allow the policy control node to decide the session management policy according to the satellite access information. Details in this regard can be ascertained with reference to the procedure (e.g., step 313) described above, and will not be repeated herein.

Figure 10:
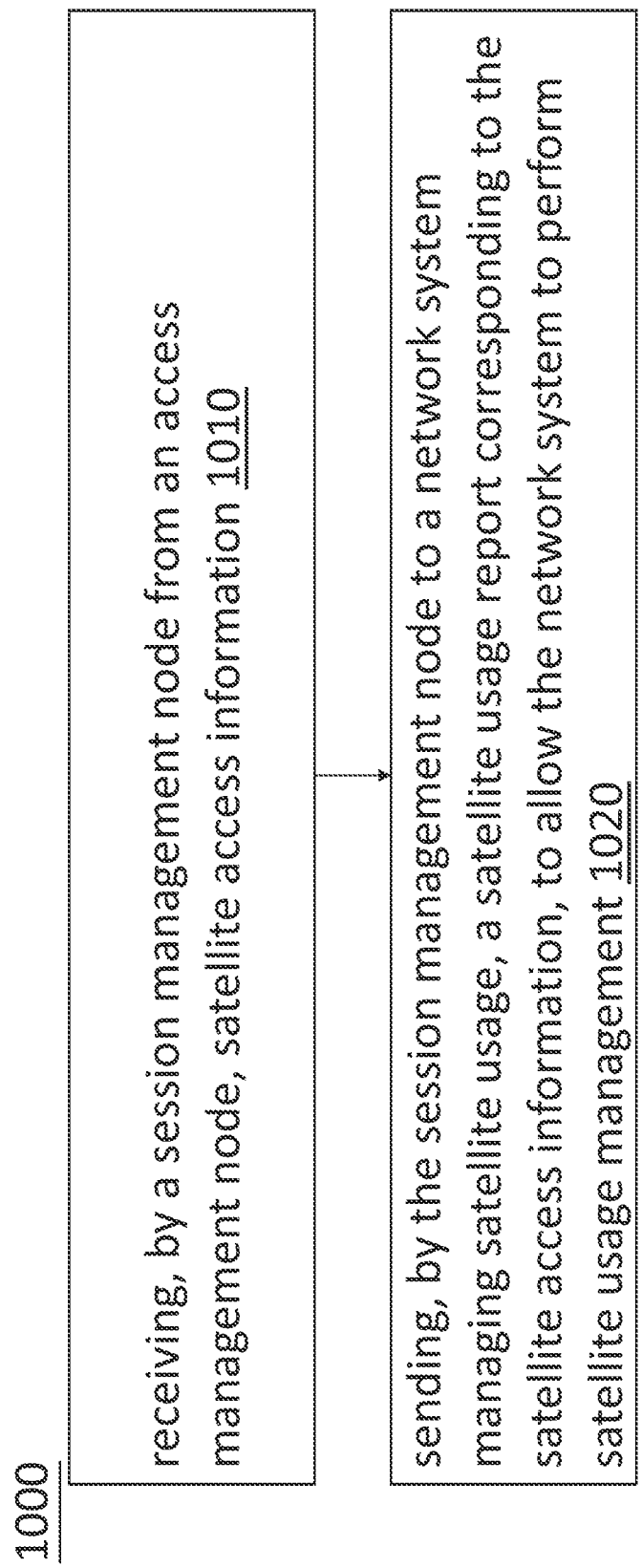
FIG. 10 illustrates another wireless communication method according to an embodiment of the present disclosure.

FIG. 10 illustrates a wireless communication method 1000 according to an embodiment of the present disclosure. In an embodiment, the wireless communication method 1000 may be performed by using a session management node (e.g., a session management device). In an embodiment, the access management node may be implemented by using the wireless network node 60 described above, but is not limited thereto.

In an embodiment, the wireless communication method 1000 includes operations 1010 and 1020.

Operation 1010 includes receiving, by a session management node from an access management node (e.g., an AMF), satellite access information.

Operation 1020 includes sending, by the session management node to a network system managing satellite usage, a satellite usage report (e.g., a charging report) corresponding to the satellite access information, to allow the network system to perform satellite usage management.

Through such a method, it is possible for the network system to use the satellite access information for a satellite usage collection.

Details of the satellite access information can be ascertained with reference to the paragraphs above, and will not be repeated herein.

In an embodiment, the network system managing satellite usage may be the charging system as described above. In an embodiment, the satellite usage report may be the charging report as described above. In an embodiment, the satellite usage report may be sent to a charging node (e.g., the CHF) in the network system.

Details in this regard can be ascertained with reference to the procedure (e.g., steps 318 and 319) described above, and will not be repeated herein.

While various embodiments of the present disclosure have been described above, it should be understood that they have been presented by way of example only, and not by way of limitation. Likewise, the various diagrams may depict an example architecture or configuration, which are provided to enable persons of ordinary skill in the art to understand exemplary features and functions of the present disclosure. Such persons would understand, however, that the present disclosure is not restricted to the illustrated example architectures or configurations, but may be implemented using a variety of alternative architectures and configurations. Additionally, as would be understood by persons of ordinary skill in the art, one or more features of one embodiment may be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations may be used herein as a convenient means of distinguishing between two or more elements or instances of an element. Thus, a reference to first and second elements does not mean that only two elements may be employed, or that the first element must precede the second element in some manner.

Additionally, a person having ordinary skill in the art would understand that information and signals may be represented using any one of a variety of different technologies and techniques. For example, data, instructions, commands, information, signals, bits and symbols, for example, which may be referenced in the above description may be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein may be implemented by electronic hardware (e.g., a digital implementation, an analog implementation, or a combination of the two), firmware, various forms of program or design code incorporating instructions (which may be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. may be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein may be implemented within or performed by an integrated circuit (IC) that may include a general purpose processor, a digital signal processor (DSP), an application specific integrated circuit (ASIC), a field programmable gate array (FPGA) or other programmable logic device, or any combination thereof. The logical blocks, units, and circuits may further include antennas and/or transceivers to communicate with various components within the network or within the device. A general purpose processor may be a microprocessor, but in the alternative, the processor may be any conventional processor, controller, or state machine. A processor may also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions may be stored as one or more instructions or code on a computer-readable medium. Thus, the steps of a method or algorithm disclosed herein may be implemented as software stored on a computer-readable medium.

Computer-readable media includes both computer storage media and communication media including any medium that may be enabled to transfer a computer program or code from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein may be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:
    transmitting, by a radio access node to an access management node, satellite access information;
    wherein the satellite access information is adapted to be used for at least one of a session policy acquisition or a satellite usage collection,
    wherein the satellite access information comprises at least one of: a Radio Access Technology (RAT) type used for satellite access or a satellite ID, and
    wherein the satellite access information is transmitted to the access management node via a Next Generation Application Protocol (NG-AP) message.

2. The wireless communication method of claim 1, wherein the RAT type used for satellite access comprises an indicator of one of Geostationary Orbit (GEO) satellite, Medium Earth Orbit (MEO) satellite, and Low Earth Orbit (LEO) satellite.

3. The wireless communication method of claim 1, wherein the satellite access information is acquired according to information from a gateway between a satellite and the radio access node.

4. The wireless communication method of claim 1, wherein the satellite access information is acquired according to information from a gateway during a Radio Resource Control (RRC) connection establishment process for a wireless communication terminal.

5. The wireless communication method of claim 1, wherein the satellite access information is transmitted to the access management node along with a registration request for a wireless communication terminal.

6. A wireless communication method comprising:
    receiving, by an access management node from a radio access node, satellite access information; and
    transmitting, by the access management node to a session management node, the satellite access information;
    wherein the satellite access information is adapted to be used for at least one of a session policy acquisition or a satellite usage collection,
    wherein the satellite access information comprises at least one of: a Radio Access Technology (RAT) type used for satellite access or a satellite ID, and
    wherein the satellite access information is transmitted to the access management node via a Next Generation Application Protocol (NG-AP) message.

7. The wireless communication method of claim 6, wherein the RAT type used for satellite access comprises an indicator of one of Geostationary Orbit (GEO) satellite, Medium Earth Orbit (MEO) satellite, and Low Earth Orbit (LEO) satellite.

8. The wireless communication method of claim 6, wherein the satellite access information is transmitted to the session management node via a message for a Protocol Data Unit (PDU) session.

9. The wireless communication method of claim 6, wherein the satellite access information is received along with a registration request for a wireless communication terminal.

10. A wireless communication method comprising:
    receiving, by a session management node from an access management node, satellite access information; and
    acquiring, by the session management node, a session management policy according to the satellite access information,
    wherein the satellite access information comprises at least one of: a Radio Access Technology (RAT) type used for satellite access or a satellite ID, and
    wherein the satellite access information is transmitted to the access management node via a Next Generation Application Protocol (NG-AP) message.

11. The wireless communication method of claim 10, wherein the session management policy is acquired in response to sending the satellite access information to a policy control node to allow the policy control node to decide the session management policy according to the satellite access information.

12. The wireless communication method of claim 10, wherein the RAT type used for satellite access comprises an indicator of one of Geostationary Orbit (GEO) satellite, Medium Earth Orbit (MEO) satellite, and Low Earth Orbit (LEO) satellite.

13. A wireless communication method comprising:
    receiving, by a session management node from an access management node, satellite access information; and
    sending, by the session management node to a network system managing satellite usage, a satellite usage report corresponding to the satellite access information, to allow the network system to perform satellite usage management,
    wherein the satellite access information comprises at least one of: a Radio Access Technology (RAT) type used for satellite access or a satellite ID, and
    wherein the satellite access information is transmitted to the access management node via a Next Generation Application Protocol (NG-AP) message.

14. The wireless communication method of claim 13, wherein the satellite usage report is sent to a charging node in the network system.

15. The wireless communication method of claim 13, wherein the RAT type used for satellite access comprises an indicator of one of Geostationary Orbit (GEO) satellite, Medium Earth Orbit (MEO) satellite, and Low Earth Orbit (LEO) satellite.

* * * * *